United States Patent [19]

Kraus et al.

[11] Patent Number: 5,263,895
[45] Date of Patent: Nov. 23, 1993

[54] REVERSE FLOW BLOCKING DEVICE FOR VEHICLE VENTILATION SYSTEM

[75] Inventors: Willibald Kraus, Grunstadt; Hans-Werner Ruckwardt, Eisenberg, both of Fed. Rep. of Germany

[73] Assignee: TRW United-Carr GmbH & Co. KG, Alsenborn, Fed. Rep. of Germany

[21] Appl. No.: 719,796

[22] Filed: Jun. 24, 1991

[30] Foreign Application Priority Data

Jul. 20, 1990 [DE] Fed. Rep. of Germany ....... 4023190

[51] Int. Cl.[5] ............................................. B60H 1/26
[52] U.S. Cl. ...................................... 454/162; 137/855
[58] Field of Search ................................ 98/2.18, 118; 137/512.1, 512.15, 855

[56] References Cited

U.S. PATENT DOCUMENTS

| | | | |
|---|---|---|---|
| 3,405,968 | 10/1968 | Feles et al. | 98/2.18 |
| 4,449,549 | 5/1984 | Weck | 137/517.1 |
| 4,667,578 | 5/1987 | Hagenah | 98/2.18 |
| 4,781,106 | 11/1988 | Frien | 98/2.18 |
| 4,924,907 | 5/1990 | Pälmer | 98/2.18 X |

*Primary Examiner*—Harold Joyce
*Attorney, Agent, or Firm*—Fay, Sharpe, Beall, Fagan, Minnich & McKee

[57] ABSTRACT

A return air blocking device (1) in the nature of a check valve for use in the ventilation system for the interior of a motor vehicle. The device comprises a housing or main frame (2) attachable in a vehicle support panel by insertion into a panel aperture. A flap-type valve element is directly connected with housing (2). Preferably, housing (2) includes a grating structure against which the flap-type valve element rests while in the closed position.

2 Claims, 4 Drawing Sheets

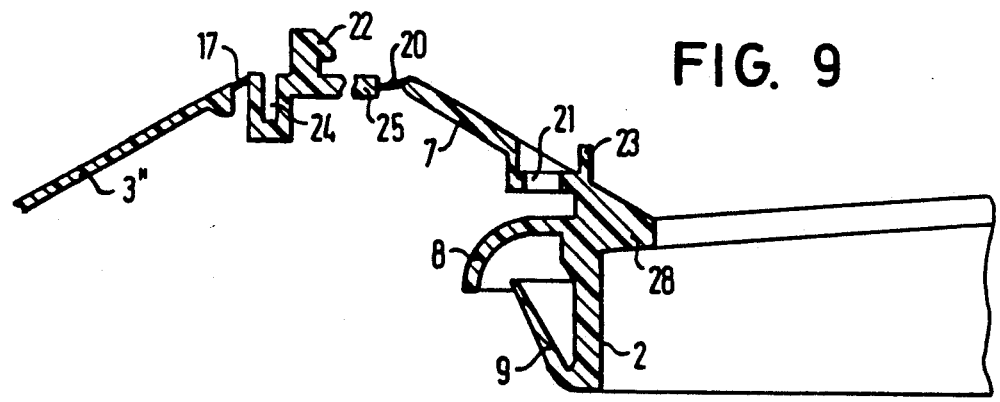
FIG. 9
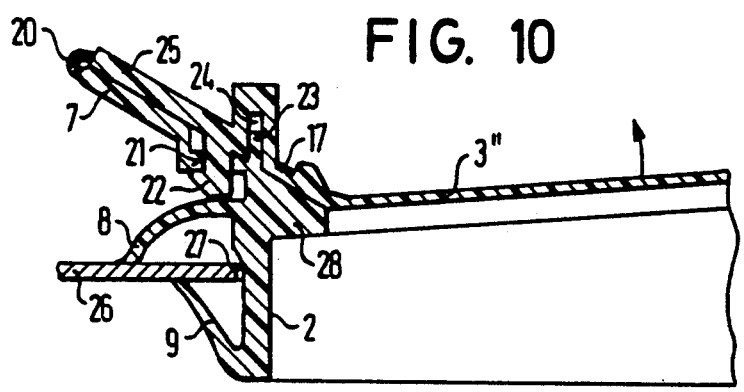
FIG. 10
FIG. 11
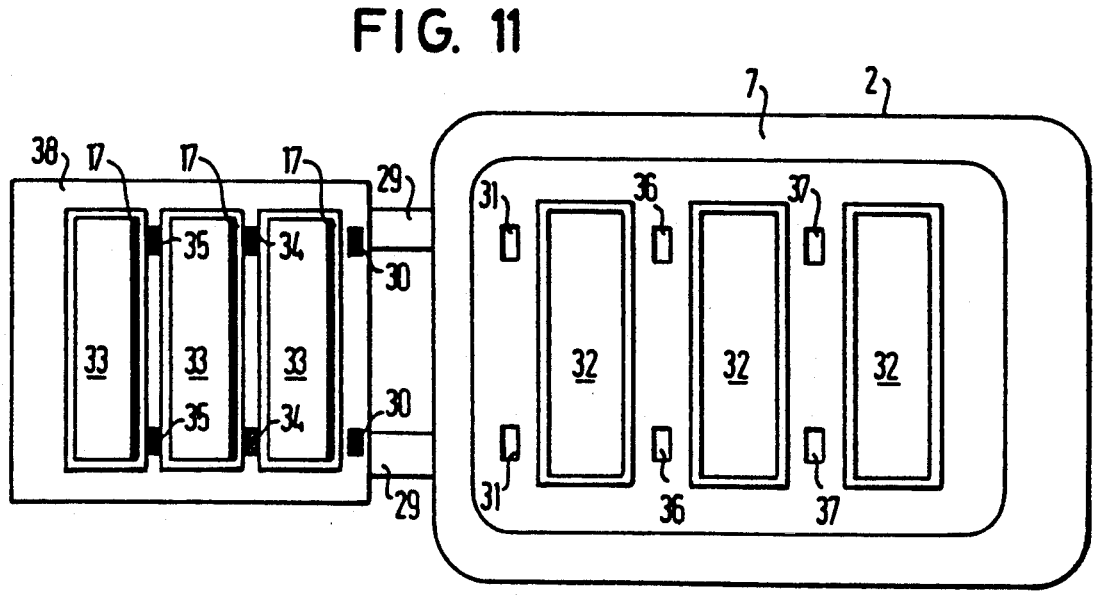

REVERSE FLOW BLOCKING DEVICE FOR VEHICLE VENTILATION SYSTEM

BACKGROUND OF THE INVENTION

The invention relates to a return air blocking device in the nature of a check valve mechanism for use in ventilation systems for the interior of motor vehicles. The device comprises a housing attachable in a support panel aperture and connected with at least one flap-type valve element which in the closed position rests against a grating.

It is known in the present state of the art to design a return air blocking device comprising an exterior housing, an inner frame, and a valve element related in such manner that the exterior housing and the inner frame are positioned in each other in nest-like fashion. The elements are joined with one another via clip connections. These clip connections of the inner frame serve simultaneously for fastening the entire unit in a support aperture.

Prior art is also known in which a return air blocking device for motor vehicles is designed for the elimination of flutter noises produced by the flap valve element. The device uses several hook-like bridges arranged in a way such that at the level at which the fluttering begins, the flap valve element touches the free tip of at least one of the bridges (German Petty Patent 37 09 224). With increasing air velocity through the device, the valve element bends at the lower edge and molds itself to the bridges and is held in angular position. This known design is expensive to construct and, further, the entire unit exhibits inadequate stability.

The suggestion has already been made to construct a return air blocking device in such manner that the inner frame is set into the front of the housing (German Printed Patent Application P 40 02 052.5).

In contrast thereto, it is the objective of the present invention to design a return air blocking device of the initially cited type in such manner that there will result a significant simplification in construction and a reduction in the number of individual parts.

SUMMARY OF THE INVENTION

The above-discussed task is solved according to the invention by a design arranged such that the valve element is connected directly with the housing. The beneficial result is a significant simplification of the entire unit with substantial reduction of the number of individual parts required for forming the device.

In further refinement of the invention, the valve element can be formed to have at least one connecting tongue designed to be attachable in an aperture in the edge area of the housing. The can extend either in the same plane as the surface of the valve element or at an angle thereto.

Alternatively, there is the possibility of having the valve element connected with the housing via laterally protruding pegs which can be set into apertures. In such arrangement, the pegs may be arranged in the edge area of the valve element and the apertures in the edge area of the housing, or vise versa.

According to a further characteristic of the invention, at least the interior edge area of the valve element can overlap an edge of the housing via a lip.

In further modification of the invention, the valve element can be designed as a single piece together with the housing and exhibit in the pivoting area at least one film hinge. In such arrangement, there is the possibility of utilizing an inner frame which can be mounted in the housing and which supports the valve element at least in the edge area. The inner frame can carry the grating against which the end cap rests in closed position.

According to another characteristic of the invention, the return air blocking device can be designed so that the housing is connected with the valve element at an outer edge area via at least a second film hinge. Preferably, the valve element includes at least one detent which can be engaged in an aperture of the housing.

In the above arrangement, the valve element can further include a centering recess in the area of the detent. The centering recess is positionable in a centering bridge of the housing, on which borders the first film hinge.

According to a further embodiment of the invention, the housing can carry, at least partially, a supporting flange for the valve element, as well as externally or internally a circumferential flange with at least one sealing lip or two opposing sealing lips.

An additional embodiment of the invention is characterized by a circumferential frame with individual valve elements. The individual valve elements are respectively connected via film hinges with the circumferential frame. The circumferential frame itself, is attached to the housing via at least one film hinge and pegs and apertures.

BRIEF DESCRIPTION OF THE DRAWINGS

The above features and objects of the invention will become apparent from the following description when read in conjunction with the accompanying drawings wherein:

FIG. 9 is a further embodiment of the invention shown partially shortened in an elevational cross-section;

FIG. 10 is the arrangement shown in FIG. 9 in installed and assembled condition; and, FIG. 11 is a top plan view of another embodiment of the invention.

DETAILED DESCRIPTION OF THE PREFERRED AND ALTERNATE EMBODIMENTS

Referring more particularly to the drawings, a preferred embodiment of the invention is shown in FIGS.

Figure 2:
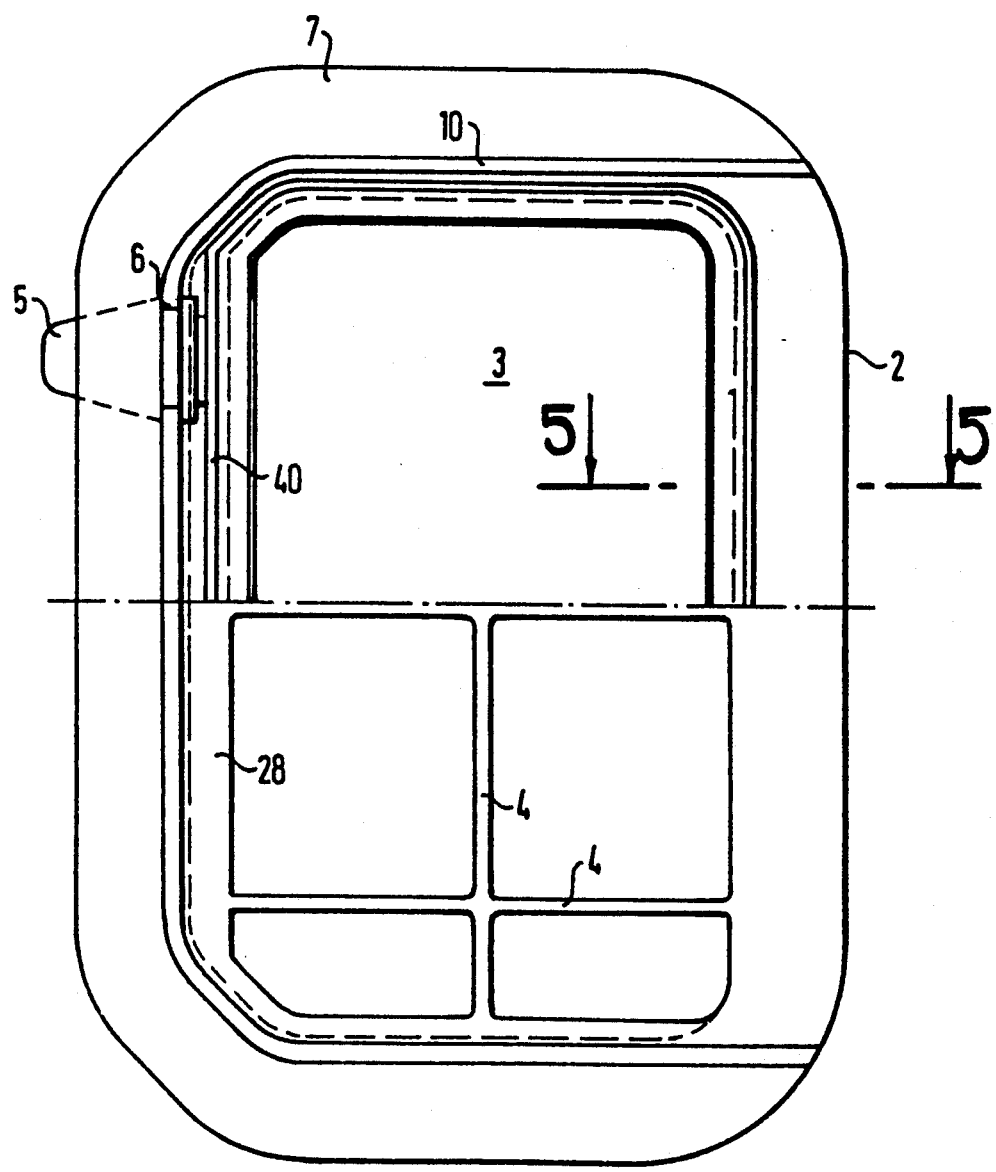
FIG. 2 is a top view of the embodiment of FIG. 1 (the lower half of the flap valve element has been omitted to more clearly show certain details of the housing)

1 and 2. As illustrated therein, the return air blocking device 1 constitutes a check valve type structure and comprises, in essence, a housing 2 and a flap-type valve element 3. The housing according to FIG. 2 is designed with a somewhat rectangular configuration and exhibits a circumferential flange 7, which is conically tapered. The housing also includes circumferential extending sealing lips s and 9 which are in opposed facing relationship and, as will subsequently be seen, provide a means for mounting the housing in a panel or wall opening. In the interior, housing 2 has a grating 4 defined by a plurality of transversely and longitudinally extending rib or web members. The grating 4 provides a support or stop which abuts the flap-type valve element 3 in its rest or closed position.

Figure 1:
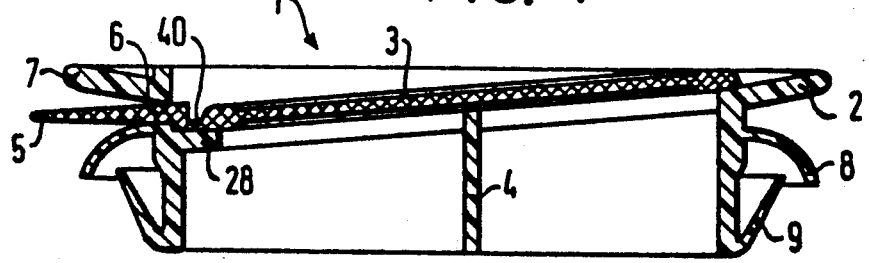
FIG. 1 is a cross-sectional elevation through a first embodiment of the return air blocking device of the invention.

The valve element 3 represented in FIGS. 1 and 2 includes two tongue-like members $ located at a distance from each other. The tongue-like members are designed in such manner that with their posterior area they are respectively locked, in an aperture 6 through snapping engagement. Furthermore, the valve element 3 is provided with a film hinge 40 in the tilting or pivoting area.

As can be seen from the foregoing, the return air blocking device according to the invention merely comprises two parts with the valve element 3 connected directly with housing 2. That is to say, in the embodiment according to FIGS. 1 and 2, a direct connection is provided by means of the two previously mentioned tongues 5. The number of the tongues in this arrangement suitably depends upon the size and the dimensions of the housing, for instance one can make use of only one or of several tongues.

Figure 3:
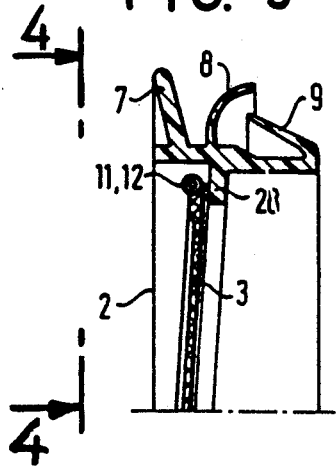
FIG. 3 is a partial cross-sectional view through a second embodiment of the invention.
Figure 4:
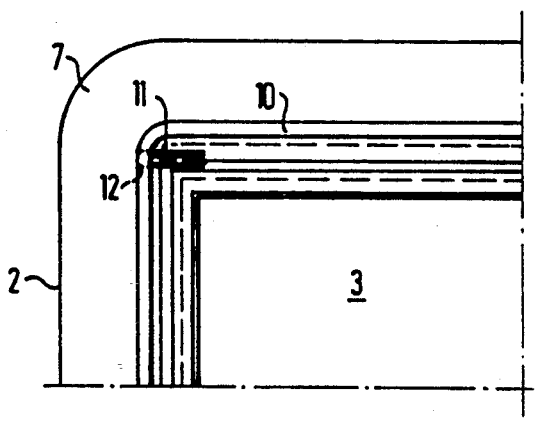
FIG. 4 is a top view of the embodiment of FIG. 3 (the view is taken on line 4—4 of FIG. 3)

In the embodiment according to FIGS. 3 and 4, the valve element 3 exhibits laterally projecting pegs 11 which can be set into apertures 12 in the edge area of the housing 2. Thus, there is produced respectively in the edge area of housing 2 a type of hinge joint around which, according to FIG. 3, the valve element can swing. The valve element 3 is shown as positioned on a frame or inwardly extending flange 28 which, for example, may be circumferentially continuous about the housing 2.

With the embodiment according to FIGS. 1 and 2, the frame or flange 28 is also present and has the objective of increasing the rigidity of housing 2, as well as providing a support for valve element 3. Furthermore, in the area of flange 7, there is provided an axially extending rib or bridge 10 according to FIGS. 2 and 4. The purpose of rib or bridge 10 is to provide stability to the frame and for the lateral limitation of valve element 3. Also, according to the embodiment of FIGS. 3 and 4, the rib 10 carries the aperture 12 for the pegs 11.

Figure 5:
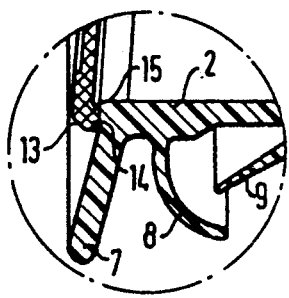
FIG. 5 is, an enlarged showing of the interior edge area of the flap valve element in position on the housing (the view is taken on line 5—5 of FIG. 2 and rotated 90° clockwise)

FIG. 5 represents the interior edge area 13 of valve element 3. It is apparent here that a lip 14 can overlap an edge 15 of housing 2 so that excellent tightness against undesired entry of dust is achieved.

Figure 6:
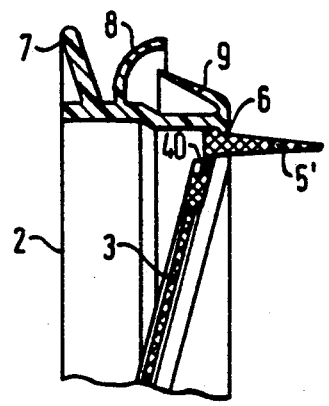
FIG. 6 shows a further embodiment of the invention in a lateral, partial cross-sectional view similar to the FIG. 3 showing.

In the embodiment according to FIGS. 1 and 2, tongues 5 are positioned in the same plane as the surface of valve element 3. There exists the possibility as shown in the embodiment according to FIG. 6, that tongue 5' can be arranged at an angle vis-a-vis the corresponding surface of valve element 3. Tongue 5' is, in turn, according to the construction form of FIGS. 1 and 2, arranged in locked, fashion in, an aperture 6 of housing 2. Between tongue 5' and the valve element 3, there is located a thin film hinge 40 which constitutes the pivot point for the tilting of the valve element 3. This is analogous to the construction described with respect to FIGS. 1 and 2.

Figure 7:
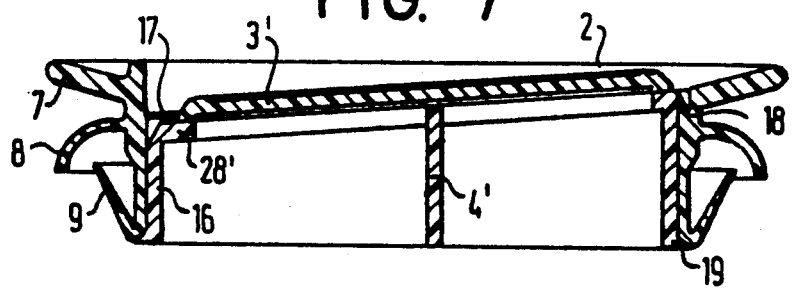
FIG. 7 is a further embodiment of the invention shown in a cross-sectional elevational view.
Figure 8:
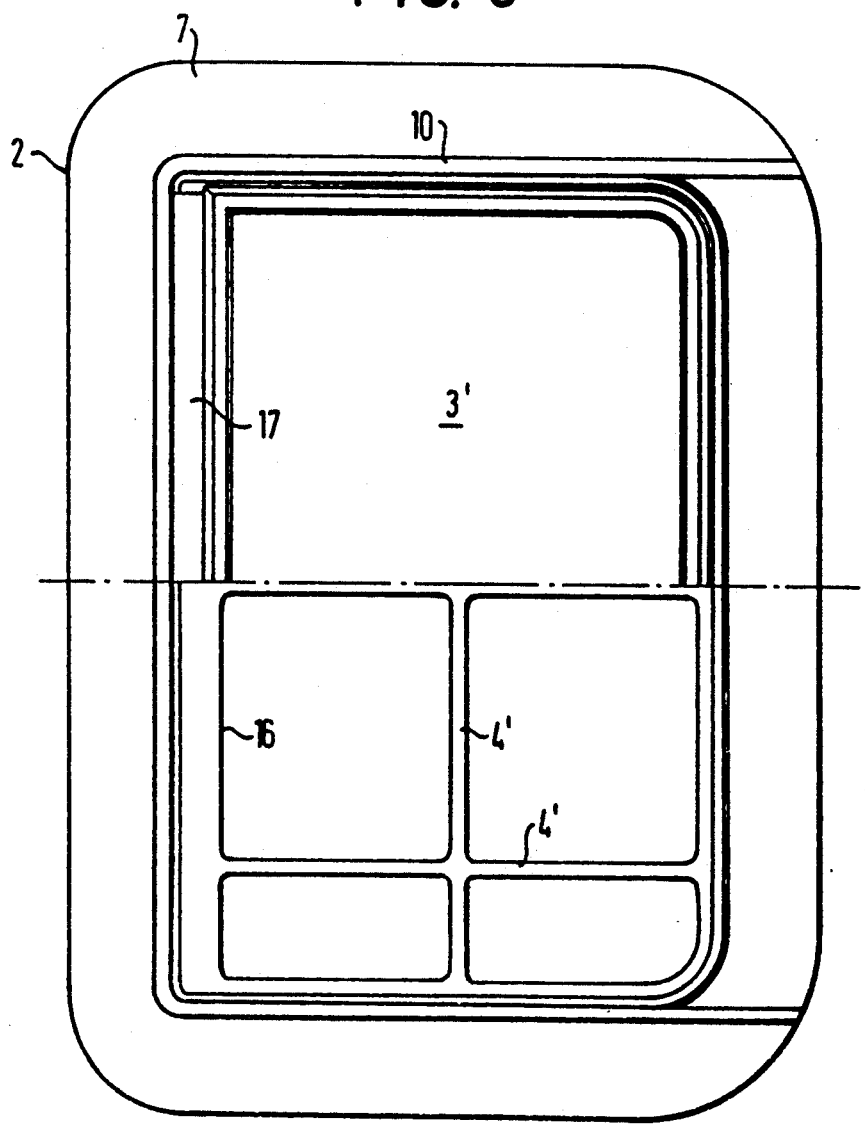
FIG. 8 is top view of the embodiment of FIG. 7.

FIGS. 7 and 8 illustrate another embodiment of the invention. In this embodiment, the valve element 3' is constructed to form one single piece with housing 2 and in the tilting region there is again provided a film hinge 17. Below the valve element 3' there is located an inner frame 16 Which is interlocked with housing 2 via a locking device 18 in the upper area, as Well as a stop 19 in the lower area of housing 2. The inner frame exhibits, at the same time, the support grating 4'. In this arrangement, it is the task of the inner frame to support the valve element 3, as well as to increase the stability of housing 2. Correspondingly, the inner frame 16 exhibits a support frame 28' in the area of film hinge 17 of valve element 3'. Support frame 28' can be designed to extend circumferentially about the interior of inner frame 16.

The embodiment according to FIGS. 9 and 10 likewise exhibits a single piece construction for housing 2 and valve element 3". FIG. 9 represents the construction in its open, as molded form. It is apparent in this drawing that frame 2, in the area of flange 7 exhibits an aperture 21 as well as a centering bridge 23. In the upper area, flange 7 is next to a second film hinge 20, which changes into an intermediate element 25. The intermediate element 25 ends in a catch lug 22, as well as in a centering recess 24. The centering recess 24, in turn, is followed by a first film hinge 17, which makes the connection with valve element 3".

The described construction for FIG. 9 allows tilting of the entire unit with intermediate element 25 and valve element cap 3" around second film hinge 20 to assume the position shown in FIG. 10. The catch lug 22 is now locked in aperture 21, and at the same time, centering bridge 23 positions itself in centering recess 24. The intermediary element 25 is bent about second film hinge 20 to lie parallel to flange 7. Thus, a situation according to FIG. 10 is produced. FIG. 10 also shows the return air blocking device in installed form. Note that the return air blocking device is mounted in an aperture 27 in a support 26 in such manner that the two sealing lips 8 and 9 respectively rest and sealingly engage on opposed surfaces of support 26. This completes the installation process and the end cap or valve element 3" is able to tilt around the first film hinge 17 in the direction of the arrow from the resting position into an open position.

The embodiment according to FIG. 11 is similar to that according to FIG. 10. It is, how for several valve elements 33. These valve elements 33 are, in turn, fastened via film hinges 17 to a circumferential frame 38. The frame 38 is connected via two film hinges 29 with housing 2 or its flange 7. In the area of the film hinges 17 of the individual valve elements are located pegs 30, 34, and 35 which, in installed condition, are positioned in apertures 31, 36 and 37 on the upper side of housing 2. In the assembled, operative condition, pegs 30 are placed in apertures 31, pegs 34 in apertures 36, and also pegs 36 in apertures 37. In such arrangement, the two film hinges 29 are again bent so that there is produced a mounted position analogous to FIG. 10. In such arrangement, the valve elements 33 are located above recesses 32 of housing 2, so that a three valve unit results.

In all the embodiments according to the invention, several valve elements may also be utilized while retaining the simple construction form.

The return air blocking device according to the invention exhibits simple construction and is designed either as a single-piece or two-piece unit with one or more valve elements.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. In a return air blocking device for the ventilation system for the interior of a motor vehicle comprising a main housing frame carrying an internal grate structure and a flap valve which in the closed position rests against the internal grate structure, the improvement wherein the flap valve is formed unitary with the main housing frame and connects therewith through a first film hinge and an intermediate element, the main housing frame being connected at an outer edge area to the intermediate element via a second film hinge, and at least one catch lug carried on one of the main housing frame and the intermediate element and a cooperating aperture carried on the other of the main housing frame and the intermediate element said aperture receives the catch lug for engaging the intermediate element to with main housing frame.

2. A return air blocking device according to claim 1 including a centering recess carried on one of the main housing frame and the intermediate element and a centering bridge for receipt in the centering recess being carried on the other of the main housing frame and the intermediate element.

* * * * *